United States Patent Office 3,645,948
Patented Feb. 29, 1972

3,645,948
AUTOMOTIVE CARPET BACKSIZING
COMPOSITION
Roland E. Stahl, Wilmington, Del., assignor to E. I. du
Pont de Nemours and Company, Wilmington, Del.
No Drawing. Continuation of abandoned application Ser.
No. 707,985, Feb. 26, 1968. This application Nov. 9,
1970, Ser. No. 88,159
Int. Cl. C08f 45/52
U.S. Cl. 260—28.5                              4 Claims

ABSTRACT OF THE DISCLOSURE

Automotive carpet backsizing compositions are disclosed which have superior adhesive properties and can be used to prepare carpets with improved shape retention. The compositions contain blends of particular ethylene/vinyl ester copolymers and microcrystalline or Fischer-Tropsch waxes having melting points of at least 165° F. and needle point penetration values of less than 10. Optionally, the compositions can contain a polyolefin such as polyethylene.

CROSS-REFERENCE TO RELATED APPLICATION

This application is a continuation of my copending application Ser. No. 707,985, filed Feb. 26, 1968 now abandoned.

Until quite recently, automotive floor covering was predominantly tufted carpet of either wool or rayon fibers or rayon-nylon fiber mixtures. However, in about the year 1967 automotive manufacturers began to show increasing interest in tufted carpets prepared from the more aesthetically pleasing nylon or polypropylene fibers. While it was found that the transition from wool and rayon type carpets to all nylon or polypropylene type carpets did not require major changes in manufacturing techniques, e.g., tufting and molding, manufacturers were faced with a major problem in obtaining, from the standpoint of cost and performance, a satisfactory backsizing composition for the new carpets.

As is well known, automotive carpeting is prepared by stitching a primary backing material, usually jute or synthetic fibers, with yarn of the desired fiber in such a manner as to form on the top surface of the material a pile composed of numerous closely spaced erect loops of yarn. Yarn at the base of each loop extends through the primary backing material and is visible on the bottom surface of the resulting loop-stitched or "tufted" structure. A backsizing composition is then applied to the bottom surface of the "tufted" structure in order to lock the tufts into the backing material and to firmly hold together the individual fibers making up a tuft. The backsizing composition also serves to impart the necessary stiffness to the carpet. After application of the backsize, the tufted structure is heated and placed in a press of the same size and shape of the automobile floor which it is intended to cover. Also, during the molding step a mat is usually adhered to the bottom surface of the carpet.

As illustrated by U.S. Pat. 3,036,942 issued to William H. Squier on May 29, 1962, the older type of carpets could be prepared using a polyethylene composition as the backsize. Not only did the polyethylene composition serve as an economic adhesive, but it also imparted the necessary stiffness to the carpet to ensure retention of shape after molding. However, polyethylene compositions have not been found to be effective backsizes for the all nylon and polypropylene carpets. While such compositions impart adequate stiffness to the newer carpets, they are deficient in adhesive characteristics. As a result, carpets prepared with such compositions tend to fuzz and pill after only minimal use. In view of the deficiency in adhesion, it has been found necessary to prepare the new carpets by a two-step process when using polyethylene compositions. First, in order to ensure adequate encapsulation of the fiber bundles, an aqueous latex composition containing, for example, a styrenebutadiene copolymer binder, is applied to the bottom surface of the tufted carpet. After the latex is dried, the polyethylene resin is applied to the bottom surface in order to obtain the proper amount of stiffness. Quite obviously, the fact that a two-step process with an intermediate drying operation must be used in order to prepare satisfactory carpet markedly detracts from the advantages of using the newer carpet fibers. Consequently, there is a significant need for an economic backsizing composition which can be used in the single step preparation of all nylon or polypropylene tufted automotive carpets.

SUMMARY OF THE INVENTION

According to the present invention, there is provided an economic backsizing composition which can be applied to a "tufted" structure in one step and which yields carpets with extremely good fuzz resistance and the desired degree of stiffness. The present composition consists essentially of (a) 30–45 percent by weight of an ethylene/vinyl ester copolymer containing 15–35 weight percent copolymerized vinyl ester and having a melt index of less than 50 and (b) 55–70 percent by weight of a microcrystalline or Fischer-Tropsch wax having a melting point of at least 165° F. and a needle point penetration value of less than 10, the weight percents of (a) and (b) being based on the combined weight of (a) and (b)

DESCRIPTION OF THE INVENTION

As use herein the term ethylene/vinyl ester copolymer refers to those copolymers of ethylene with a vinyl alcohol ester of a saturated monocarboxylic acid. Included among such vinyl alcohol esters are those of $C_1$–$C_4$ saturated monocarboxylic acids such as vinyl formate, vinyl acetate, vinyl propionate, and vinyl butyrate. Due to its ready availability, vinyl acetate is an especially preferred comonomer. Useful copolymers are those having a copolymerized vinyl ester content of about 15–35 percent and 65–85 weight percent copolymerized ethylene. Copolymers with lesser amounts of copolymerized vinyl ester content yield compositions with insufficient adhesivity for use in the present invention. Copolymers containing more than about 35 percent copolymerized vinyl ester are not compatible with the wax ingredient, and the resulting compositions tend to be flaky and are not suitable for use herein. Balancing cost and adhesive performance, copolymers containing about 16–20 weight percent copolymerized vinyl acetate are presently preferred.

While not narrowly limited, the molecular weight of useful ethylene/vinyl ester copolymers should be that corresponding to a melt index (ASTM D-1238, Condition E) of less than about 50 and, preferably, less than about 10. As higher melt indexes are used, the resultant backsizing composition becomes increasingly brittle and carpets so prepared tend to crack in use. Especially preferred copolymers have a melt index of about 1.5–4.

Waxes useful in the present invention are selected from particular microcrystalline or Fischer-Tropsch waxes. Microcrystalline wax is obtained from the non-distillable still residues from the fractional distillation of petroleum. It differs from paraffin wax in having branched hydrocarbons of higher molecular weight. It is considerably more plastic than paraffin wax and usually has a melting point of about 150–200° F. Fischer-Tropsch wax is a synthetic hydrocarbon wax of very high molecular weight obtained as a by-product in the synthesis of liquid fuel (gasoline and diesel oil) from carbon monoxide and hydrogen by the Fischer-Tropsch process. These synthetic waxes generally have melting points within the range of about 100–250° F.

For use in the present invention it is necessary to use either a microcrystalline or a Fischer-Tropsch wax having a melting point of at least 165° F. and a needle point penetration value of less than about 10. The use of paraffin waxes, which normally have melting points below about 165° F., as opposed to either of these two, yields a backsizing composition which has an excessively low softening temperature for automotive carpets while carpets backsized with compositions containing microcrystalline or Fischer-Tropsch waxes, which have melting points above 165° F., maintain their molded shape in shipment and storage. The needle point penetration value of the wax is an especially important property. This value, which is indicative of the hardness of the wax, is measured according to ASTM D-1321 at 77° F. It has been discovered that the use of waxes with needle point penetration values of greater than 10 yield carpets which also do not have sufficient stiffness to maintain their molded shape after molding. Microcrystalline and Fischer-Tropsch waxes having needle point penetration values of about 7 are especially preferred.

In preparing the present backsize composition it is necessary that the ethylene/vinyl ester copolymer and the wax be combined in particular proportions. In general, based on the combined weight of the copolymer and wax, the copolymer is present in an amount of about 30–45 weight percent and the wax is present in an amount of 55–70 weight percent. The use of higher quantities of copolymer not only adds to the cost of the blend but, additionally, requires high application temperatures in order to obtain suitable viscosities. For some applications, the required temperature may even exceed the permissible limit for the carpet fiber. Compositions containing lesser amounts of the copolymer ingredient are generally deficient in adhesive properties to permit their successful use. A composition containing about 40 percent copolymer and about 60 percent wax is preferred. While not essential, ingredients other than the wax and copolymer can also be present. Such ingredients might include fillers, resin extenders, and, as illustrated hereinafter, polyolefins such as polyethylene. Consistently therewith the use of the phrase "consisting essentially of" in the present application does not exclude the presence of other ingredients which do not prevent the advantages of the present invention from being realized.

The present backsize composition can be prepared by any of the well-known techniques for preparing copolymer-wax blends. Similarly, the composition can be applied to the bottom surface of the tufted structure by any known application technique, though roll coating or application as a powder is presently preferred. When a melt method, such as roll coating, is used, the composition is usually applied at a temperature of about 250–360° F. and, preferably, above 300° F. When a powder method is used, sintering is accomplished at about 300–460° F. and, preferably, above 350° F.

The amount of backsize composition which is applied to the carpet to ensure both pill resistance and shape retention depends to some extent on the temperature to which the backsize composition is to be subjected during the molding step. It has been found that if the molding temperature is less than about 400° F., e.g., 350–400° F., ordinarily at least 10 oz. of backsize composition must be used per sq. yd. of carpet. For molding temperatures in excess of 400° F., as little as 8 oz./sq. yd. of backsize can be used though amounts in excess of 9 oz./sq. yd. are preferred. To a more limited extent than the molding temperature, the pressure with which the backsize composition is forced into the carpet before solidification influences the amount of backsize required. Thus, at high pressures somewhat lesser amounts of backsize may be required than at lower pressures, e.g., even with molding temperatures slightly below 400° F., less than 10 oz./sq. yd. of backsize may be used if sufficient pressure is applied. Pressure is ordinarily applied by means of nip rolls, which are placed either above the applicator roll or immediately thereafter in combination with a chill roll.

A modification of the present invention involves the use of a polyolefin in combination with the ethylene/vinyl ester copolymer-wax blend described above. A polyethylene having a melt index of about 10–125, preferably 20–60, is ordinarily used. When employed, the polyolefin is mixed directly with the copolymer-wax blend as a powder prior to application to the carpet or it is applied to the carpet after the application of the copolymer-wax blend.

With the use of a polyolefin, lesser amounts of the copolymer-wax blend can be employed than when the blend is used alone. However, the total amount of backsize composition, i.e., polyolefin plus, copolymer-wax blend, is usually more than when the copolymer-wax blend is solely used. In general, even at high molding temperatures at least 9.5 oz./sq. yd., and preferably at least 12 oz./sq. yd., of polyolefin containing backsize composition is used. At least 25 weight percent, preferably at least 40 weight percent, of such a composition consists of the copolymer-wax blend.

The following examples illustrate the invention. All parts and percentages are by weight unless otherwise indicated.

Example I

Even pile continuous filament nylon carpet having 11.2 oz./sq. yd. of face yarn, 6.4 stitches per inch, and 6.6 rows per inch, was backsized by application of a hot melt composed of 40 parts by weight of ethylene/vinyl acetate copolymer (18 weight percent vinyl acetate, 2.5 melt index) and 60 parts by weight of microcrystalline wax (minimum melting point 190° F., needle penetration of 7 at 77° F.). Coating application was accomplished with a roll coater operated at a circumferential speed of fifteen feet per minute. Carpet speed was also fifteen feet per minute. After coating, the carpet was passed over a chill roll upon which rode a nip roll to which weights could be added to increase the nip roll pressure. After passing through the nip roll, the carpet was wound up on a wind-up roll, and later cut into sections for molding. Molding was accomplished by heating the carpet, face side down, until the desired backsize temperature was obtained. The heated carpet was then removed from the oven and immediately molded under a pressure of about 2 lbs./sq. in. The carpet was then rated for pilling resistance and for shape retention.

Pilling resistance was evaluated by tumbling carpet samples under controlled conditions in a home-type clothes dryer in the presence of abradants to promote pilling and fuzzing. After testing, the samples were subjectively evaluated for pill resistance using a scale of 1.0 (poorest) to 5.0 (best) with a 4.0 rating considered passable. Shape retention was also evaluated subjectively and reported as poor (P), acceptable (A), or excellent (E). Table I presents the pill resistance and shape retention results for a variety of carpet samples.

TABLE I

| Run No. | Hot melt temp., °F. | Backsize weight, oz./sq. yd. | Nip roll pressure, lbs./in. | Maximum backsize temp., °F. during molding | Pill resistance | Shape retention |
| --- | --- | --- | --- | --- | --- | --- |
| 1 | 335 | 7.8 | 7.8 | >400 | 4.4 | A |
| 2 | 335 | 7.8 | 7.8 | 370 | 3.0 | A |
| 3 | 342 | 8.6 | 7.8 | 360 | 3.2 | A |
| 4 | 342 | 8.6 | 7.8 | >400 | 4.8 | E |
| 5 | 343 | 9.4 | 7.8 | 340 | 4.6 | A |
| 6 | 343 | 9.4 | 7.8 | 385 | 4.9 | E |
| 7 | 340 | 9.4 | 5.1 | 375 | 5.0 | P |
| 8 | 345 | 10.2 | 7.8 | 350 | 5.0 | E |
| 9 | 345 | 10.2 | 7.8 | >400 | 4.9 | E |
| 10 | 345 | 11.5 | 7.8 | 255 | 4.5 | E |
| 11 | 345 | 11.5 | 7.8 | 310 | 4.8 | E |
| 12 | 345 | 11.5 | 7.8 | >400 | 4.8 | E |
| 13 | 335 | 8.6 | 10.3 | 395 | 4.7 | A |
| 14 | 341 | 9.7 | 10.3 | 385 | 4.8 | E |
| 15 | 335 | 10.9 | 10.3 | 380 | 4.8 | E |

Example II

Nylon carpet was coated with the same formulation and in the same manner as described in Example I. However, after the carpet passed over the chill roll, powdered 20 melt index polyethylene, 100% of which passed through a 16-mesh screen, was applied to the hot melt coated carpet which was then passed through an oven to melt the backsize. As the carpet emerged from the oven it was passed through a set of nip rolls, cooled, cut into sections, and molded as described in Example I. Results are shown below in Table II.

30 parts of copolymer-wax blend powder to 70 parts of polyethylene. This powder blend was charged into a dispensing hopper, and approximately 12 oz./sq. yd. of this powdered mixture was coated on the back of even pile nylon carpet traveling about 30 feet per minute. The carpet passed through a heated oven, and upon emerging from the oven the backsize had reached a temperature of about 410–420° F. The carpet was then passed through a set of chilled nip rolls under a pressure of 10 pounds/inch. The cooled carpet was then tested for pilling resistance which was found to be approximately 4.0 and for shape retention which was found to be acceptable.

TABLE II

| Run No. | Hot melt coating conditions | | | Polyethylene coating conditions | | | Total backsize wt., oz./sq. yd. | Max. backsize temp., °F. during molding | Pill resistance | Shape retention |
| --- | --- | --- | --- | --- | --- | --- | --- | --- | --- | --- |
| | Hot melt temp., °F. | Backsize weight, oz./sq. yd. | Nip roll pressure, lbs./in. | Weight, oz./sq. yd. | Max. backsize temp., °F. | Nip roll pressure, lbs./in. | | | | |
| 16 | 330 | 2.6 | 10.3 | 7.4 | 360 | 13 | 10 | >400 | 4.8 | P |
| 17 | 330 | 2.6 | 10.3 | 9.4 | 370 | 13 | 12 | 320 | 4.9 | A |
| 18 | 330 | 2.6 | 10.3 | 11.4 | 320 | 13 | 14 | 380 | 4.9 | E |
| 19 | 330 | 2.6 | 10.3 | 11.4 | 320 | 13 | 14 | 390 | 5.0 | E |
| 20 | 334 | 4.0 | 10.3 | 6.0 | >400 | 13 | 10 | >400 | 5.0 | A |
| 21 | 334 | 4.0 | 10.3 | 8.0 | >400 | 13 | 12 | 385 | 5.0 | E |
| 22 | 334 | 4.0 | 10.3 | 10.0 | 350 | 13 | 14 | 385 | 5.0 | E |
| 23 | 333 | 7.0 | 10.3 | 3.0 | 360 | 13 | 10 | >400 | 4.9 | A |
| 24 | 333 | 7.0 | 10.3 | 5.0 | 360 | 13 | 12 | >400 | 5.0 | E |
| 25 | 333 | 7.0 | 10.3 | 7.0 | 350 | 13 | 14 | 380 | 4.9 | E |

Example III

An ethylene/vinyl acetate copolymer-wax blend of the kind described in Example I was mechanically ground until all of the material passed through a 16-mesh screen. This powder was charged into a dispensing hopper, and into a second hopper was charged 20 melt index polyethylene which had also been ground to pass through a 16-mesh screen. Even pile nylon carpet of the same general type described in Example I was pulled, face side down, at a speed of about 38 feet per minute, under the powder dispensing hoppers which were arranged so as to dispense the copolymer-wax powder first and the polyethylene second. Approximately 4.2 oz./sq. yd. of copolymer-wax powder was added, and about 7.6 oz./sq. yd. of polyethylene was applied. The carpet was passed through a heated oven, and as it emerged the temperature of the molten backsize was 395° F. Subsequently, the carpet passed through a chilled set of nip rolls under a pressure of about 30 pounds/inch. After cooling, the carpet was tested for pilling resistance which was found to be greater than 4.0. Samples of this carpet were also tested with a Taber abraser Model 174 using Calibrade H–18 wheels under 1000 gram loads on each wheel for a total of 1000 cycles. The face yarn did not wear through to the primary backing in this test. Shape retention was also acceptable.

Example IV

A powdered ethylene/vinyl acetate copolymer-wax blend and a powdered polyethylene of the types described in Example III were dry blended in the weight ratio of Example V Even pile continuous filament polypropylene carpet having about 12 oz./sq. yd. of face yarn is backsized with the same formulation and in the same manner as described in Example I. Coating temperature is 320° F., and nip roll pressure is 10.3 pounds per inch. About 12 oz./sq. yd. of backsize is put on the carpet which is then molded at a maximum backsize temperature of 280° F. Pill resistance of this carpet is 4.0, and shape retention is acceptable.

Example VI

Even pile continuous filament nylon carpet having 11.2 oz./sq. yd. of face yarn, 6.4 stitches per inch, and 6.6 rows per inch, is backsized by application of a hot melt similar to that of Example I. For this example the primary backing material is a synthetic composition of spun bonded polypropylene whereas the primary backing material in the carpets of the previous examples is jute. Coating application to a weight of 11.5 oz./sq. yd. is accomplished at 330° F. with a roll coater operating at a circumferential speed of fifteen feet per minute. Carpet speed is also fifteen feet per minute. After coating, the carpet is passed over a chill roll upon which rides a nip roll operated at a pressure of 7.8 lbs./in. After passing through the nip roll, the carpet is wound upon a wind-up roll, and is later cut into sections for molding. Molding is accomplished by heating the carpet, face side down, until a backsize temperature of 280° F. is obtained. The heated carpet is then removed from the oven and immediately molded under a pressure of about 2 lbs./sq. in.

The carpet so prepared has satisfactory pill resistance and shape retention.

In comparison, attempts to use polyethylene as the backsizing composition for the Example VI carpet are unsuccessful. Temperatures at which the polyethylene has a suitable viscosity for application to the carpet are quite high and application at such temperatures is found to be harmful to the spun bonded polypropylene backing. A lower application temperatures which are suitable for use with the synthetic backing, the viscosity of the polyethylene backsize is too high to be functional.

I claim:

1. A composition, effective as a backsize for automotive carpeting, consisting essentially of (a) 30–45 weight percent ethylene/vinyl ester copolymer containing 15–35 weight percent copolymerized vinyl ester and having a melt index of less than 50 and (b) 55–70 weight percent of a microcrystalline or Fisher-Tropsch wax having a melting point of at least 165° F. and a needle point penetration value of less than 10, the weight percents of (a) and (b) being based on the combined weight of (a) and (b).

2. The composition of claim 1 wherein the vinyl ester is vinyl acetate.

3. The composition of claim 2 wherein the ethylene/vinyl acetate copolymer contains 16–20 weight percent copolymerized vinyl acetate.

4. The composition of claim 3 wherein the microcrystalline or Fischer-Tropsch wax has a needle point penetration value of less than 7.

References Cited

UNITED STATES PATENTS 3,330,793   11/1967   Podlipnik _____ 260—28.5 AV

OTHER REFERENCES

Du Pont, "Technical Information," 300 series Elvax Vinyresins PL14–865, August 1965.

THEODORE MORRIS, Primary Examiner

U.S. Cl. X.R.

117—138.8 E, 138.8 N; 161—53, 67